March 4, 1969  S. L. TERRY ET AL  3,430,979
INFLATABLE CUSHIONING DEVICE
Filed Nov. 17, 1966
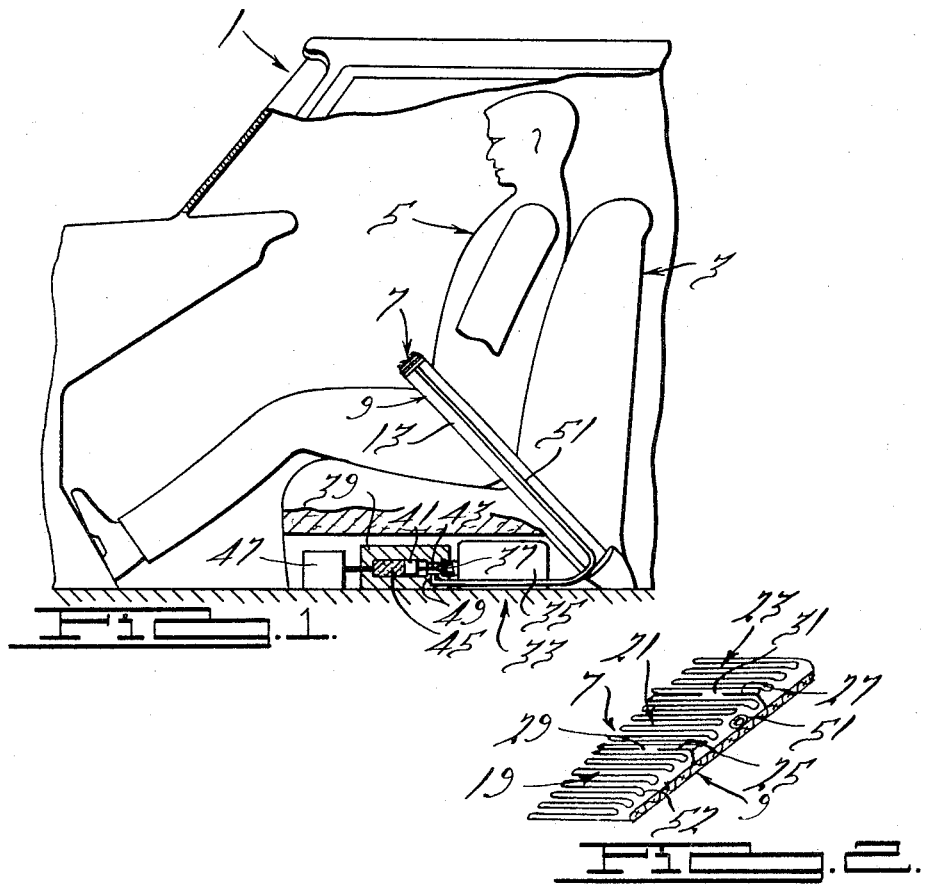
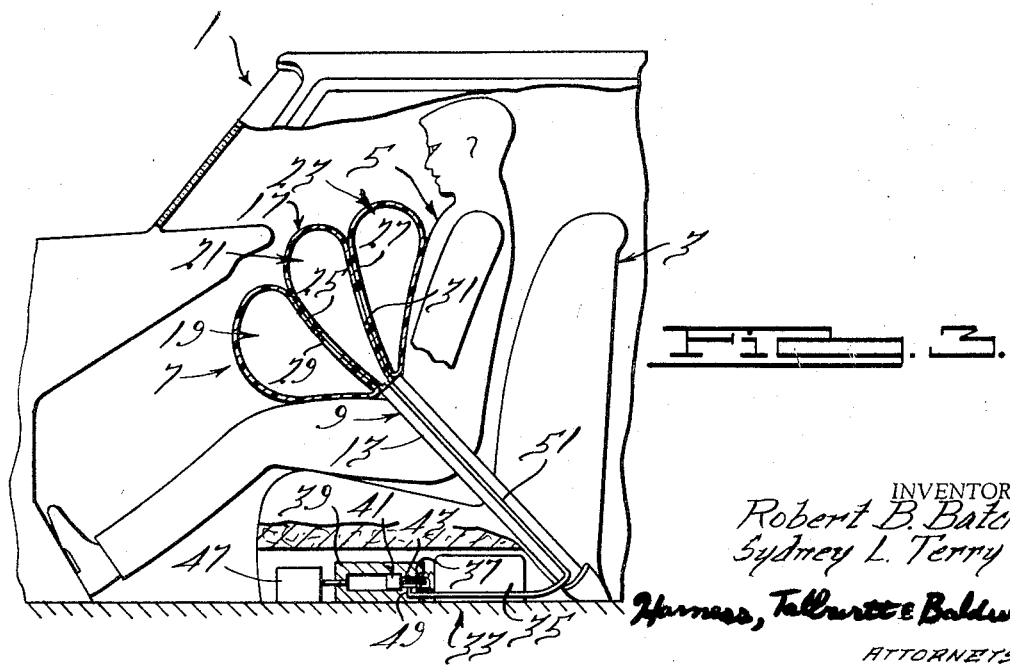
INVENTORS.
Robert B. Batchelor,
Sydney L. Terry
Harness, Tolbert & Baldwin
ATTORNEYS.

March 4, 1969 S. L. TERRY ET AL 3,430,979
INFLATABLE CUSHIONING DEVICE

Filed Nov. 17, 1966

INVENTORS
Robert B. Batchelor,
Sydney L. Terry
Harness, Talburtt & Baldwin
ATTORNEYS.

United States Patent Office 3,430,979
Patented Mar. 4, 1969

3,430,979
INFLATABLE CUSHIONING DEVICE
Sydney L. Terry, Grosse Pointe Farms, and Robert B. Batchelor, Birmingham, Mich., assignors to Chrysler Corporation, Highland Park, Mich., a corporation of Delaware
Filed Nov. 17, 1966, Ser. No. 595,242
U.S. Cl. 280—150                              12 Claims
Int. Cl. B60r 21/08, 21/10

ABSTRACT OF THE DISCLOSURE

Lap belt device having an inflatable bag connected thereto, the bag being inflatable to provide a resilient brace between the upper torso of a passenger and the upper legs of the passenger.

The present invention relates to an inflatable cushioning device, and more particularly to an inflatable device for restraining the forward movement of the upper torso of a passenger in a rapidly decelerating vehicle.

It is known in the prior art to provide one or more inflatable bags in the passenger compartment of a vehicle, such as an automobile for example, which bags are inflated when the vehicle collides with a fixed object or another moving object. The bags and their inflating mechanisms are constructed to operate in such a manner that the bags will be inflated upon sudden deceleration or impact of the vehicle prior to any significant forward movement of the passenger in the vehicle. The prior art bags have been mounted in various fixed locations, such as on the instrument panel, or attached to the interior of the roof of the vehicle, or, in the case of rear seat passengers, on the back of the front seat, for example. One of the disadvantages of such prior art inflatable bags is the size which they must assume upon inflation to be effective. The bags, partially because of their attachment to a fixed support, had to occupy, upon inflation, substantially all of the space between the fixed support and the passenger to prevent forward movement of the latter. This not only required supplying a relatively large quantity of gas or air to the bag in a very short time, but the inflated bag obstructed the vision of the passenger, thus possibly preventing the latter from making an accurate appraisal of the situation and possibly even inducing panic in the passenger.

Accordingly, one of the primary objects of the present invention is to provide an inflatable device for a passenger in a vehicle which may be quickly and rapidly inflated to restrain the forward movement of the upper torso of the passenger.

Another object of the present invention is to provide an inflatable device of the type described which is adapted to be inflated with substantially less gas or air than many previously known inflatable cushions.

A further object of the present invention is to provide an inflatable device such as described which allows the passenger using the device substantially unobstructed vision after inflation has taken place.

Still another object of the present invention is to provide an inflatable device of the class described which is relatively unobstrusive prior to inflation.

A further object of the present invention is to provide an inflatable device of the type described which does not require any extensive redesign of the vehicle interior, and which is not attached to any rigid support.

Another object of this invention is to provide an inflatable device such as described which is relatively simple in construction and effective in operation.

Other objects and advantages of the present invention will become apparent as the description progresses.

Briefly, the invention comprises an inflatable bag attached to a lap belt the opposite ends of which are anchored to the vehicle.

Referring now to the drawings, in which two of various possible embodiments of this invention are illustrated.

FIG. 1 is a side elevation of a passenger in a vehicle with a device constructed in accordance with one embodiment of this invention being shown in deflated position, certain parts being shown in section for clarity;

FIG. 2 is an enlarged fragmentary view of the device shown in FIG. 1, certain parts being shown in section and others diagrammatically for clarity;

FIG. 3 is a view similar to FIG. 1, showing the device in an inflated position;

Like parts are indicated by corresponding reference characters throughout the several views of the drawings.

Figure 4:
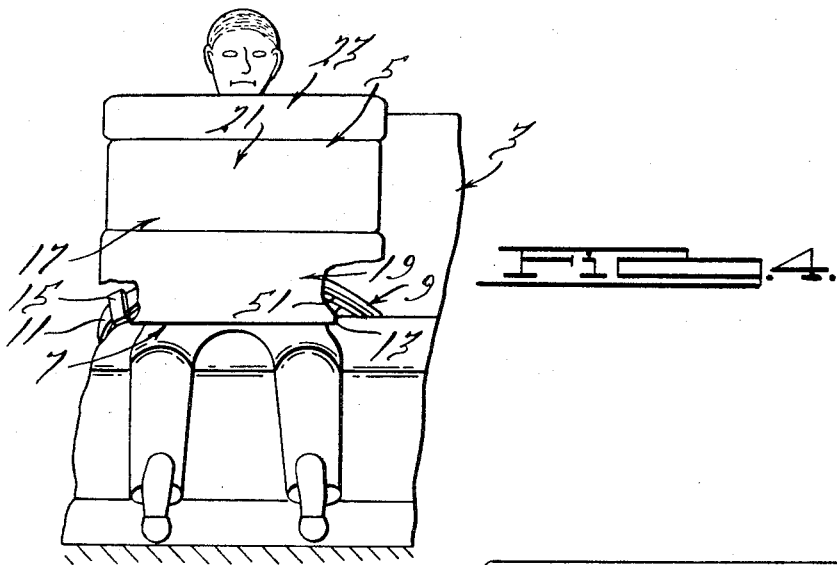
FIG. 4 is a front elevation of FIG. 3, certain parts being removed for clarity.

Referring now to the drawings, a passenger compartment of a vehicle, such as an automobile, is indicated generally at 1. The front seat in the compartment is designated 3 with a passenger 5 being seated thereon.

An inflatable device of this invention is shown at 7 and, as shown, is attached to a lap belt 9. Lap belt 9 may include two separate belt portions 11 and 13, (see FIG. 4) one end of each of which is securely anchored to the vehicle. The other ends of belt portions 11 and 13 are provided with conventional buckling members adapted to be releaseably locked together as indicated at 15.

Inflatable device 7 comprises an inflatable multi-sectioned bag 17 formed of suitable flexible material such as polyethylene, for example, capable of withstanding substantial internal and external pressures and without deforming unduly or rupturing. The bag 17, as shown, is formed in three sections 19, 21 and 23, with sections 19 and 21 having a common wall 25 and sections 21 and 23 having a common wall 27 throughout a portion of their sides. Walls 25 and 27 are provided with openings 29 and 31 to permit substantially simultaneous inflation of the sections 21, 23 and 25.

In an uninflated condition, bag 17 may be folded substantially as shown in FIG. 2 so that it is out of the way and remains unobtrusive. The bag may be connected to the belt 9 by any suitable fastening means, such as heat sealing, for example, which forms a substantially airtight connection.

As shown, the bag 17, upon inflation, may have a width large enough to extend across the average width of a human torso and arms. The side portions of the bag could extend rearwardly toward the back of the seat so that a curved cushion extends from the seat on one side of the passenger around in front of the passenger to the seat on the other side of the passenger. Thus, the passenger would be protected even if he is thrown to one side or the other upon impact. However, it will be understood that the bag could be narrower so that it extends only across the torso or a portion thereof, if desired.

The bag 17 is adapted to be inflated by an inflating mechanism 33 which may take the form of various known mechanisms of this type and is here shown in one embodiment to include a cylinder 35 of compressed gas or liquid adapted to vaporize rapidly when a seal 37 is broken. The cylinder 35 is attached to a valve body 39 which has a bore aligned with the neck of the cylinder. A piston 41 having a puncturing pin 43 is slideably mounted in the valve bore adjacent an explosive charge 45. The charge 45 is adapted to be ignited by a triggering device 47 capable of transmitting an electrical impulse and adapted to be actuated when the vehicle is either hit from any direction by a force exceeding a predetermined amount or undergoes a predetermined rate of deceleration. There are many such triggering devices known in the art which will trigger the charge 45 and any of these devices which will function effectively will suffice.

A port 49 in valve body 39 extends from a point adjacent the neck of cylinder 35 to a flexible tube 51 running from body 39 to the lap belt 9 and then along the belt to the bag 17. The tube 51 is attached to the belt to keep it from becoming entangled with the hardware in the passenger compartment.

Operation of the inflatable device of this invention is as follows:

Assume first that the passenger is in the position shown in FIG. 1. When the vehicle undergoes a rapid deceleration, such as occurs when it collides with an obstacle, the triggering device 47 senses the deceleration before the passenger begins any substantial forward movement. Device 47 ignites the explosive charge 45, which in turn forces piston 41 to the right as viewed in FIG. 1 and causes plunger pin 43 to rupture the seal 37. The fluid or gas in cylinder 35 immediately expands and passes through port 49 and tube 51 into bag 17. The bag immediately expands to the position shown in FIGS. 3 and 4 to provide a safety cushion for the upper torso of the passenger which moves forward into contact with section 23 of the bag. The belt 9 prevents the hips of the passenger from being thrown forward a substantial distance. However, without the provision of the inflatable bag 17, the passenger would tend to jackknife, with the upper torso being thrown forward toward relatively fixed structures in front of the passenger, such as for example, the window and/or the instrument panel, and the legs being thrown upwardly toward the instrument panel. Bag 17 creates a resilient brace between the thighs or upper legs and the upper torso to prevent such jackknifing. Thus, the bag not only prevents the upper torso from being thrown forward, but also, due to the force of the upper torso against the section 23, tends to keep the upper legs against the seat and away from the instrument panel. Moreover, it will be noted that the vision of the passenger is unobstructed after the bag is inflated.

Figure 5:
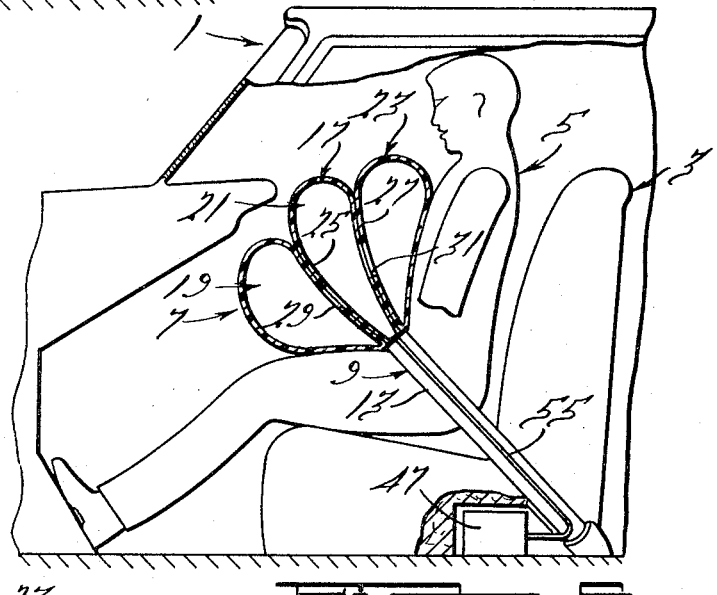
FIG. 5 is a view similar to FIG. 3 illustrating a second embodiment of this invention.
Figure 6:
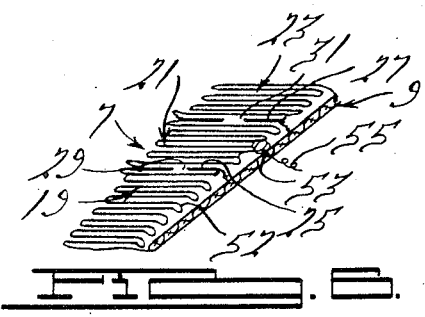
FIG. 6 is an enlarged fragmentary view, similar to FIG. 2, of the device shown in FIG. 5.

A second embodiment of this invention is illustrated in FIGS. 5 and 6. This embodiment includes a bag 17 connected to lap belt 9 and is similar to the first embodiment except for the method of and apparatus for inflation. The interior walls of the bag may be provided with a thin coating 52 of explosive material or powder, such as nitrocellulose, for example, or a supply of such material might be deposited in the bag. A cap 53 or other small ignition change is located within the bag 17 and is connected by a wire or wires 55 directly to a triggering device 47. When the vehicle is hit with sufficient force or decelerates rapidly enough to actuate the device 47, the cap is ignited through the electrical wire connection between the device 47 and the cap. The ignited cap immediately ignites the explosive material or powder and the expanding gas from the explosion inflates the bag to the position shown in FIG. 5. The formation of the inflating gas takes place inside the bag 17, thus eliminating the time required for and the necessity of delivering gas through an elongated passage to the bag.

Instead of igniting the explosive material coating on the inside of the bag by means of a cap 53, a lattice of very fine metallic filaments similar to the filaments used in photographic flashbulbs, for example, could be placed in contact with or imbedded in the coating on the interior of the bag. The wire 55 would be connected to the lattice of metallic filaments so that an electrical connection is made between the latter and device 47. When electric current flows through the lattice of metallic filaments due to actuation of triggering device 47, the explosive material is ignited and gas formed therefrom inflates the bag.

The inflatable device of this invention thus effectively restrains the upper torso of a passenger in a vehicle during sudden deceleration of the latter, while at the same time it permits unobstructed vision. If the width of the bag is only as wide as the torso, substantial freedom of movement of the passenger's arms may also be obtained. Furthermore, when the bag is in a deflated condition, it is unobtrusive. It will also be noted that the sectional construction of the bag prevents inflation of the latter in a manner which would substantially obstruct the vision of the passenger, such as would occur if the bag were merely of a round balloon shape. In regard to this sectional construction, it will be understood that the three section bag shown is exemplary, and that a bag having fewer or more sections may be employed without departing from the scope of the invention.

In view of the foregoing it will be seen that the several objects and other advantages of this invention are obtained.

It will be understood that the invention is not to be limited to the exact constructions shown and described, but that various changes and modifications may be made without departing from the spirit and scope of the invention, as defined in the appended claims.

We claim:

1. A cushioning device for use in the passenger compartment of a vehicle, the compartment including relatively fixed structures in front of a passenger comprising a lap belt the opposite ends of which are anchored to the vehicle, said lap belt being adapted to extend across the front of a midportion of a passenger and inhibit substantial forward movement of the midportion relative to the vehicle upon rapid deceleration of the vehicle, an inflatable bag attached to the lap belt and extending in front of the passenger, and means for inflating said bag in response to a predetermined rate of deceleration of the vehicle, said bag located and shaped relative to said fixed structures for causing the bag, upon inflation, to form a resilient brace, independent of the relatively fixed structures in front of the passenger, between the passenger's upper torso and the passenger's upper legs to inhibit jackknifing of the passenger independently of the restraint offered by the relatively fixed structures in front of the passenger.

2. A cushioning device as set forth in claim 1 wherein said bag includes means for preventing inflation of the bag to a point wherein vision of the passenger is substantially obstructed.

3. A cushioning device as set forth in claim 1 wherein said bag has a plurality of sections adapted, upon inflation, to prevent the bag from substantially obstructing the vision of the passenger.

4. A cushioning device as set forth in claim 1 wherein said bag includes wall means dividing said bag into a plurality of sections.

5. A cushioning device as set forth in claim 4 wherein said wall means have openings therein to permit inflation of all sections when inflation of one section occurs.

6. A cushioning device as set forth in claim 1 wherein said means for inflating said bag includes a source of fluid, means for discharging said fluid from said source, and passage forming means connecting said means for discharging fluid to said bag, said passage forming means extending along said lap belt.

7. A cushioning device as set forth in claim 6 wherein said bag has a plurality of sections adapted, upon inflation, to prevent the bag from substantially obstructing the vision of the passenger.

8. A cushioning device for use in the passenger compartment of a vehicle, the compartment including relatively fixed structures in front of a passenger, comprising means anchored to the vehicle and adapted to extend across the front of a midportion of a passenger, an inflatable bag located in front of and attached to said means, said bag extending in front of the passenger, and means for inflating said bag in response to a predetermined rate of deceleration of the vehicle, said bag located and shaped relative to said fixed structure for causing the bag, upon inflation, to form a resilient brace, independent of the relatively fixed structures in front of the passenger, between the passenger's upper torso and the passenger's upper legs to inhibit jackknifing of the passenger independently of the restraint offered by the relatively fixed structures in front of the passenger.

9. A cushioning device as set forth in claim 8 wherein said means for inflating said bag comprises a supply of explosive material inside said bag, and means for igniting said explosive material in response to a predetermined rate of deceleration of the vehicle, said explosive material, when ignited, creating gas which inflates said bag.

10. A cushioning device as set forth in claim 9 wherein said supply of explosive material comprises a thin coating of said material on the inside walls of said bag.

11. A cushioning device as set forth in claim 9 wherein said means anchored to the vehicle comprises a lap belt the opposite ends of which are anchored to the vehicle, said bag being attached to the lap belt and extending in front of a passenger.

12. A cushioning device as set forth in claim 11 wherein said supply of explosive material comprises a thin coating of said material on the inside walls of said bag.

References Cited

UNITED STATES PATENTS

| 2,689,812 | 9/1954 | Mollica et al. | 9—11.1 X |
| 2,752,616 | 7/1956 | Coates et al. | 9—11.1 |
| 2,816,299 | 12/1957 | Holladay | 9—11.1 |
| 2,834,609 | 5/1958 | Bertrand | 280—150 |
| 2,850,291 | 9/1958 | Ziccardi | 280—150 |
| 3,197,234 | 7/1965 | Bertrand | 280—150 |

FOREIGN PATENTS 1,392,677   9/1965   France.

LEO FRIAGLIA, *Primary Examiner.*

JOEL E. SIEGEL, *Assistant Examiner.*

U.S. Cl. X.R.

9—11.1